Jan. 5, 1937.  L. R. BEALL  2,066,818
EDUCATIONAL AND AMUSEMENT DEVICE
Filed Jan. 13, 1936  2 Sheets-Sheet 1
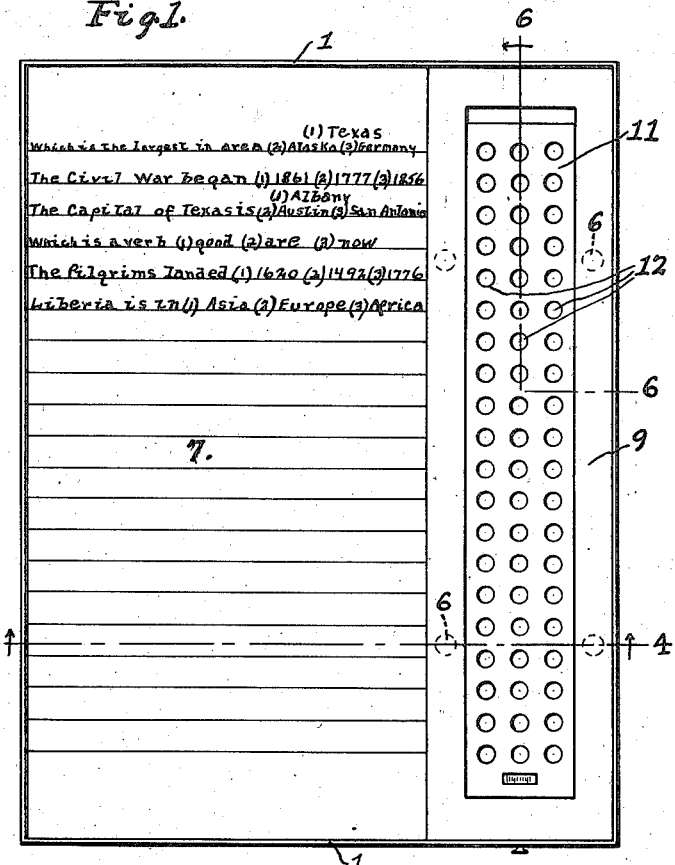
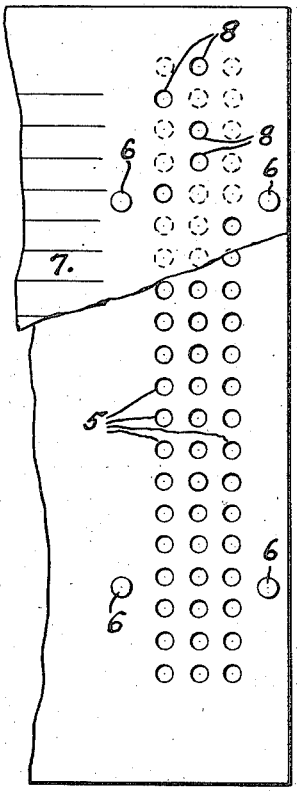
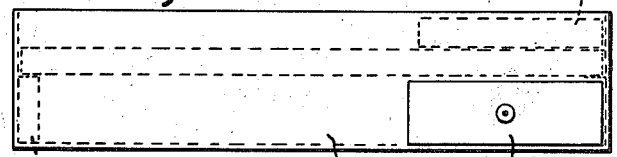
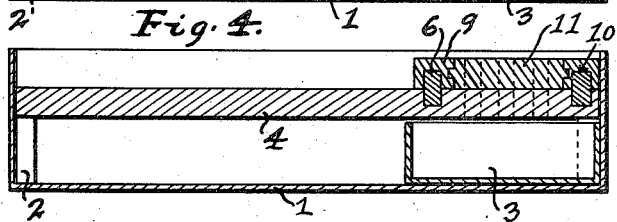
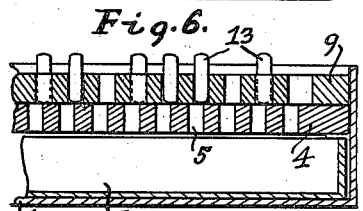
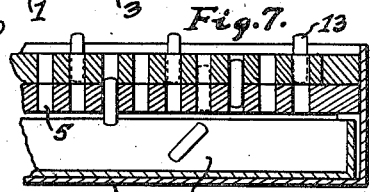
Inventor
LAWRENCE R. BEALL
By Albert R. Dietrich
Theodore W. Rutley
Attorneys Jan. 5, 1937.　　　　　L. R. BEALL　　　　　2,066,818

EDUCATIONAL AND AMUSEMENT DEVICE

Filed Jan. 13, 1936　　　2 Sheets-Sheet 2

Inventor
LAWRENCE R. BEALL

Patented Jan. 5, 1937

2,066,818

UNITED STATES PATENT OFFICE 2,066,818

EDUCATIONAL AND AMUSEMENT DEVICE

Lawrence R. Beall, Washington, D. C.

Application January 13, 1936, Serial No. 58,946

7 Claims. (Cl. 35—48)

My invention relates to amusement devices that test one's ability to use the knowledge acquired through attending school, reading the newspapers or books and through listening to radio programs. Primarily the invention has for its object to provide an apparatus that is relatively simple and economical in construction.

Further, it is an object of the invention to provide a game which will appeal to young and old alike by virtue of the infinite variety of the questions which may be used.

Further, it is an object of the invention to provide a game which is interesting to play but at the same time acquaints the player with the true answer to the questions asked, thereby increasing his general knowledge.

Further, it is an object of this invention to provide a game which clearly and simply indicates whether the answer chosen by the player is correct or incorrect.

Other objects will in part be obvious and in part be pointed out hereinafter.

To the attainment of the aforesaid objects and ends the invention still further resides in those novel details of construction, combination and arrangement of parts, all of which will be first fully described in the following detailed description, then be pointed out in the appended claims reference being had to the accompanying drawings, in which:

Figure 1 is a plan view of the invention.

Figure 2 is a detail plan view showing some parts removed and some broken off.

Figure 3 is an end view of the structure shown in Figure 1.

Figure 4 is a cross section on the line 4—4 of Figure 1.

Figure 5 is a perspective view of one of the answer pins.

Figure 6 is a detail section on the line 6—6 of Figure 1 showing the parts in the position shown in Figure 1.

Figure 7 is similar to Figure 6 but showing the slide advanced to release the correct answer pins.

Figure 8:
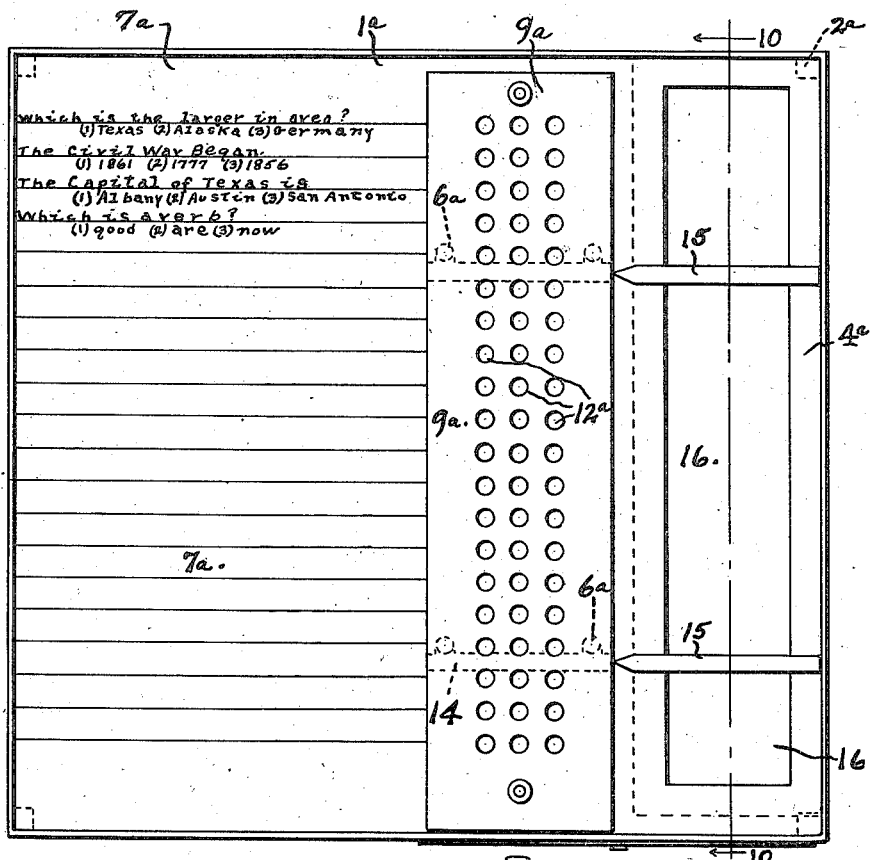
Figure 8 is a plan view showing a modified construction.

In the drawings, in which like numerals of reference indicate like parts in all of the figures, 1 represents the container in which the same is sold and which supports it when said game is used. The container 1 has supports 2 glued in its four corners to provide a base for the game board. A drawer 3 is provided in the container 1 to catch the answer pins 13. The game board proper consists of a checking board 4 having holes 5 and pins 6. The pins 6 not only act as positioners for the question and answer paper 7 but they also engage the work board 9 by the holes 10 drilled in the said work board 9. The answer paper 7 has checking holes 8 through which the answer pins 13 will drop when the answer indicating slide 11 is advanced to the position shown in Figure 7. If, however, the pins 13 are inserted in the holes 12 in the answer indicating slide 11 in any of the holes other than the one which is the right answer, then the pin will remain standing when the slide is advanced to its checking position, thus indicating an incorrect answer.

Figure 9:
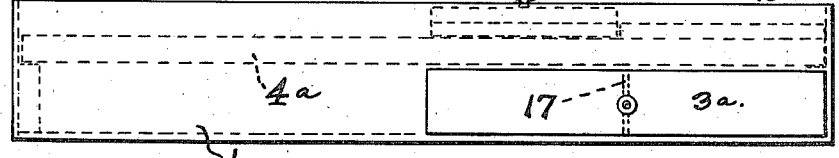
Figure 9 is an end elevation of the structure shown in Figure 8.
Figure 10:
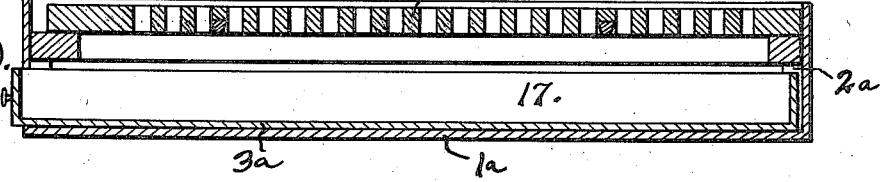
Figure 10 is a section on the line 10—10 of Figure 8.

The modified Figures 8, 9 and 10, bear the same numerals as the other figures plus the index letter "a".

The new numerals in Figures 8, 9 and 10 are as follows: 14 indicates a dovetailed groove which slides on the tapered dovetailed track 15. The incorrect answer pins are discharged by advancing the board 9a up and to the right until it is in a position above the hole 16, thus allowing the pins to drop through into the drawer 3 which in Figures 8, 9 and 10, has a portion 17 which keeps separate the correct and incorrect answer pins.

The use of my device is quite simple even for a youngster. The one using the device first removes the work board 9 and places a question and answer paper 7 in its position on the pins 6, then replaces the board 9 and pulls the answer indicating slide 11 down until it contacts at the bottom with the board 9. Then the player reads the question, selects his answer and places a pin 13 in the hole 12 which is in the same column as the answer which he chose and also opposite the question he is answering. After answering all the questions he advances the board 11 upwards which causes all of the correct answer pins to drop through to the drawer 3. The incorrectly answered questions are indicated by the pins left standing. In the modified form shown in Figures 8, 9 and 10 it is unnecessary to remove the board 9a but merely shift it to its position for discharging the incorrect answer pins which leaves the pins 6a clear to receive the question and answer paper 7a. The board 9a is then returned to its correct position for the start of the game and the same procedure is followed as set forth in describing the preferred form of the device. When all of the questions have been answered instead of advancing the slide 11 as in the preferred form, we advance the board 9a to its uppermost position which causes the pins, indicating the questions which have been correctly answered, to drop through into a portion of the drawer 3. By moving the board 9a back to its original position and then shifting it to the right on the tracks or runners 15 the pins indicating questions which are incorrect will drop into the other portion of the drawer. Thus by counting the pins in the left half of the drawer the correctly answered questions may be checked against the number of pins in the right half of the drawer which indicates only incorrectly answered questions.

From the foregoing description, taken in connection with the accompanying drawings, it is thought that the construction, operation and advantages of my invention will be readily understood by those skilled in the art.

What I claim is:

1. In apparatus of the character stated, a checking board having sheet positioning means, a sheet having indicia making up questions to be answered and cooperating with said positioning means, said sheet and said board having correct answer pin passages which register with one another, a work board having correct and incorrect pinholes normally out of register with the pin passages of said sheet and said checking board; said work board having provisions for shifting its pinholes to bring the correct pinholes of said work board into register with the pin passages of said sheet and said checking board, and a set of pins formed to be placed in said pinholes and to be passed through said pin passages.

2. In apparatus of the character stated, a checking board having sheet positioning means, a sheet having indicia making up questions to be answered and cooperating with said positioning means, said sheet and said board having correct answer pin passages which register with one another, a work board having correct and incorrect pinholes normally out of register with the pin passages of said sheet and said checking board; said work board having provisions for shifting its pinholes to bring the correct pinholes of said work board into register with the pin passages of said sheet and said checking board, and a set of pins formed to be placed in said pinholes and to be passed through said pin passages, said work board being further slidably mounted to release the incorrect answer pins.

3. In apparatus of the character described, a question sheet having a set of suggested answers to the questions thereon and having pin passing holes corresponding to the correct answers only; a checking board having pin passing holes corresponding in number to the number of suggested answers; means to definitely position said sheet with its correct answer holes registering with a predetermined set f holes of said checking board; a work board slidably mounted over the apertured portion of said sheet and itself having pin passing holes corresponding in number to the number of suggested answers and located to register with the holes of said sheet and checking board when the aperture portion of said work board is in one position and to be out of register when the aperture portion of the work board is in another position, and a set of answer pins cooperating with the aforesaid structure substantially as and for the purpose described.

4. In apparatus of the character stated, a question paper having suggested answers, a checking board on which said paper may be positioned for checking purposes, a work board cooperating with the paper and checking board, said paper and said checking board and said work board having correct answer pinholes arranged to be brought into register at will, the pinholes of said work board being normally out of register with the pinholes of said sheet and checking board, said work board having provisions in virtue of which the correct answer pinholes of the work board may be brought into register with those of said sheet and checking board and a set of answer pins to be used in conjunction with the aforesaid structure for the purposes described.

5. In apparatus of the character stated, a question paper having suggested answers, a checking board on which said paper may be positioned for checking purposes, a work board cooperating with the paper and checking board, said paper and said checking board and said work board having correct answer pinholes arranged to be brought into register at will, the pinholes of said work board being normally out of register with the pinholes of said sheet and checking board, said work board having provisions in virtue of which the correct answer pinholes of the work board may be brought into register with those of said sheet and checking board and a set of answer pins cooperating with the aforesaid structure, said checking board being supported within a container, said container having a drawer to catch the pins.

6. In apparatus of the character stated, a printed question and answer paper, a work board, a checking board, pins for answering said questions, holes in said boards and said paper to receive said pins, means for advancing said work board after the questions have been answered so as to bring holes in said work board into alignment with the holes in said checking board and said paper.

7. A self-checking question and answer device comprising a question and answer paper interposed between a checking board and a work board, a drawer divided into two sections and being directly under the said boards, said boards both having holes therein equal in number to the number of questions asked and the number of answers suggested, said question and answer paper only having one hole opposite each question, said hole designating the correct answer, said device having pins with which to answer the questions, and means for advancing said board to a position where the correct answer pins will be discharged through said question and answer paper holes and through said checking board holes and also means for shifting said work board to one side thus discharging said incorrect answer pins, said pins falling into the said partitioned drawer.

LAWRENCE R. BEALL.